No. 777,549. Patented December 13, 1904.

UNITED STATES PATENT OFFICE.

JOSEPH SCHNEIBLE, OF WEEHAWKEN, NEW JERSEY.

ART OF BREWING.

SPECIFICATION forming part of Letters Patent No. 777,549, dated December 13, 1904.

Application filed December 7, 1903. Serial No. 184,082. (No specimens.)

*To all whom it may concern:*

Be it known that I, JOSEPH SCHNEIBLE, a citizen of the United States, residing in Weehawken, county of Hudson, State of New Jersey, have invented certain new and useful Improvements in the Art of Brewing, of which the following is a specification.

It is well known that in the fermentation of beer, ale, and other liquors the yeast which is propagated during the process of fermentation is nourished by substances contained in the liquid undergoing fermentation, particularly nitrogenous substances, phosphates, and potash salts, all of which form desirable constituents of the beer, wort, or other liquid and, if allowed to remain in the liquid, would improve particularly the foam-keeping qualities of the finished product and the fullness and richness in taste thereof. In the ordinary methods of brewing in which only a part of the yeast which is propagated during fermentation is preserved, while the greater part thereof is thrown away, the finished product is therefore impoverished as to these desirable constituents through the removal of such constituents with the waste yeast. Furthermore, in every brewing about two per centum of the beer itself is taken away with the waste yeast as rest-beer, thus reducing the amount of extractive matter and increasing the waste. It has been proposed heretofore to save the otherwise lost constituents of the yeast by subjecting the yeast to a treatment which has for its object the production of a yeast-food adapted to be used for culinary and medicinal purposes as well as for the nourishment of yeast. The methods devised for the purpose, however, are not only somewhat complicated and expensive, but they are not well adapted for use in the art of brewing.

The object of this invention is not to produce a yeast-food for culinary or medicinal purposes or for the mere nourishment of yeast, but to prevent the impoverishment of the fermented liquor in respect of the desirable constituents referred to and to preserve such constituents as well as the extractive matter of the rest-beer, so that in a series of brewings (the term being used in a general sense) there is no waste, but in all brewings of a series, except the first, an enrichment of the beer by the desirable constituents referred to and the extractive matter of the rest-beer.

In accordance with the present invention all of the waste which is left in the vessels in which yeast produced during fermentation is allowed to precipitate, such as fermenting vessels and storage vessels, including both top and bottom yeast, rest-beer, and all other substances, but excepting the yeast which is specially reserved for the pitching of the next brewing, instead of being thrown away or subjected by itself to any treatment is collected and is added to the wort-kettle, preferably after the malt wort runs from the mash into the kettle, as soon as steam is turned on in the kettle and before the hops are added. The wort, with the waste mixed therewith, is then brought to a boil, as usual, and after a few minutes the first hops are added and the kettle is finished in the usual manner. The waste thus added to the wort increases the proportion of the nitrogenous and other desirable constituents and extractive matter, so that up to the time that the beer-wort is separated from the yeast there is present in the beer-wort and in the yeast an increased amount of these constituents. The removal of a portion of these constituents with the yeast, therefore, still leaves the beer-wort a normal quantity of such constituents. In other words, the addition of the nitrogenous and other desirable substances with the waste yeast compensates in advance for the quantity of these constituents which is removed with the yeast when the fermentation is complete. In the first of a series of fermentations there is obviously no waste yeast to be added, and unless means are taken to supply the desirable constituents the liquor from the first brewing will be impoverished as regards such constituents; but the waste yeast from the fermentation of the first brewing goes into the wort-kettle at the second brewing, and so on, so that after the first brewing all of the desirable constituents of the wort which are now lost are retained, and the character of the finished product is thereby much improved, particularly as regards foam-keeping qualities and fullness and richness in taste. The quantity of waste added to the wort varies with different conditions of brewing, being in each case a quantity equivalent to the whole amount produced in a single brewing. This may be from one to two per centum, more or less, of the total quantity of wort, according to the conditions under which the brewing is carried on.

It will be understood that the term "waste" herein employed is intended to include the whole or any part of the yeast and liquor which is now ordinarily thrown away or is reserved, as in some cases it has been proposed to do, for further treatment by itself. It will also be understood that while it is preferable to add the waste to the wort-kettle at the time indicated above it is nevertheless possible to change the time at which it is added and yet secure satisfactory results.

I claim as my invention—

1. The improvements in the art of brewing which consists in adding the waste from a previous fermentation to the wort-kettle in a succeeding brewing.

2. The improvements in the art of brewing which consists in adding the waste from a previous fermentation to the wort-kettle in a succeeding brewing and boiling such waste with the wort.

3. The improvements in the art of brewing which consists in adding the waste from a previous fermentation to the wort-kettle in a succeeding brewing, boiling such waste with the wort and subsequently adding hops.

This specification signed and witnessed this 4th day of December, A. D. 1903.

JOSEPH SCHNEIBLE.

In presence of—
EDWARD ZAHM,
W. B. GREELEY.